Jan. 5, 1943.  C. E. KNOX, JR  2,307,685
PIPE
Filed Dec. 31, 1941
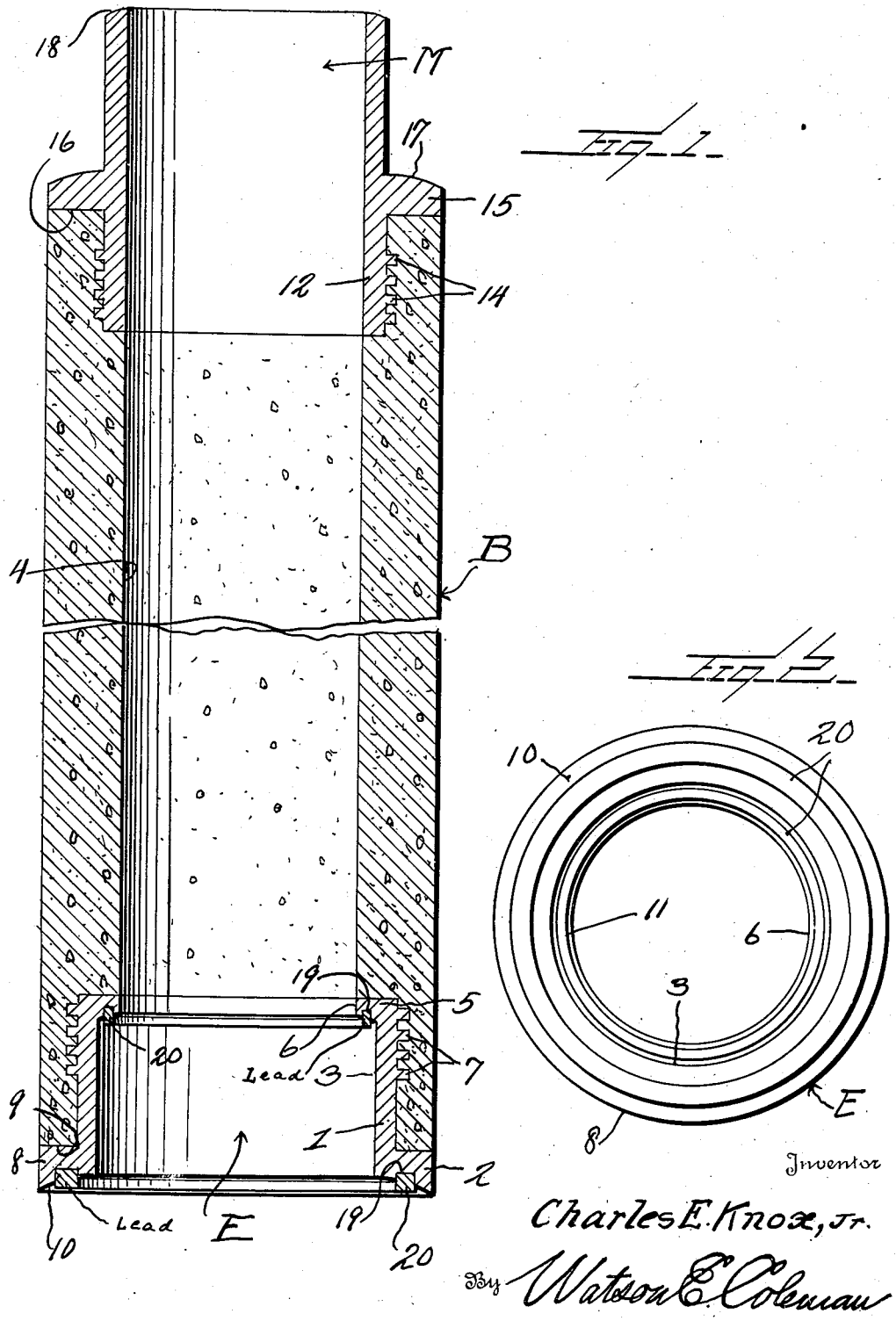
Inventor
Charles E. Knox, Jr.
By Watson E. Coleman
Attorney Patented Jan. 5, 1943

2,307,685

UNITED STATES PATENT OFFICE 2,307,685

PIPE

Charles E. Knox, Jr., Enid, Okla., assignor of one-half to Richard M. Knox, Enid, Okla.

Application December 31, 1941, Serial No. 425,224

3 Claims. (Cl. 285—161)

This invention relates to pipes, and has relation more particularly to pipes for use in oil or other deep wells, and it is primarily an object of the invention to provide a pipe wherein the major or body portion is produced from a cementitious or other initially plastic material together with preformed ends, preferably steel, of a male and female type, and which ends are of a character to coact in a manner to provide self-sealing between adjacent assembled pipes.

It is also an object of the invention to provide a pipe particularly adapted for use in oil or other deep wells, and which pipe is constructed in a manner to effect a material saving in metal tonnage.

The invention consists in the details of construction and in the combination and arrangement of the several parts of my improved pipe whereby certain important advantages are attained, as will be hereinafter more fully set forth.

In order that my invention may be the better understood, I will now proceed to describe the same with reference to the accompanying drawing, wherein:

Figure 1 is a longitudinal sectional view taken through a pipe constructed in accordance with an embodiment of my invention; and Figure 2 is a view in front or outer end elevation of the female end member herein comprised.

As disclosed in the accompanying drawing, B denotes the body of the pipe which comprises properly molded cementitious or other initially plastic material. In the present instance this body B is approximately 25' in length and has a bore of approximately 6" in diameter, with the thickness of the wall approximately 2". These measurements are based on a pipe adapted for use in connection with an oil or other deep well. I do not, however, wish to be understood as limiting myself to these dimensions or to this particular use.

Associated with the extremities of the body B are the end members E and M, the member E constituting a female member and the member M constituting a male member. These members E and M are preformed from metal, preferably steel, and are properly applied to the body B at the time said body B is being molded or formed.

The member E, in the present embodiment of the invention, comprises a sleeve 1 having its outer end defined by an outstanding surrounding flange 2. The bore 3 of the member E is greater than the bore 4 of the body B and the inner or inserted end of the sleeve 1 is defined by an inwardly disposed surrounding flange 5, the inner edge face 6 of which being flush with the wall of the bore 4. The sleeve 1 is provided therearound with a series of outstanding flanges or ribs 7 spaced apart lengthwise of the sleeve 1. These flanges or ribs 7 provide means to assure the effective anchoring of the member E in applied position with respect to the body B. As is clearly illustrated in Figure 1 of the drawing, the applied member E has the periphery 8 of the flange 2 flush with the periphery of the body B and the inner or back face 9 of the flange 2 is in close contact with the adjacent end of the body B.

The outer face 10 of the flange 2 is dished on a desired curvature, and the inner face 11 of the flange 5 is also dished on a predetermined curvature.

The member M comprises a sleeve 12, one end portion of which is disposed within the second end portion of the body B, and said inserted portion of the sleeve 12 is effectively held in proper assembly with respect to the body B by the outstanding surrounding flanges 14 spaced lengthwise of the sleeve. At a desired point intermediate its ends the sleeve 12 is provided with the outstanding surrounding flange 15, the inner face 16 of which having close contact with the adjacent end of the body B. The outer face 17 of the flange 15 is rounded in cross-section on a curvature similar to the curvature of the face 10 of the member E.

The sleeve 12, in advance of the flange 15, is of a length substantially equal to the length of the bore 3 of the member E from the inner margin of the face 10 to the outer margin of the face 11 so that when a member M is received within a member E the faces 10 and 17 will be in close contact and the outer edge face 18 of the sleeve 12 will be in close contact with the face 11. As illustrated in the drawing, the outer edge face 18 of the sleeve 12 is disposed on an inward curvature substantially similar to the face 11 of the flange 5.

The faces 10 and 11 of the member E are provided therearound with the continuous grooves or channels 19 in which are received the rings or gaskets 20 of lead or other soft metal, said gaskets or rings initially projecting outwardly beyond the faces 10 and 11.

When the sleeve 12 of a member M is lowered into the member E of a second pipe therebelow, as in oil or other deep wells, the gaskets or rings 20 will be so distorted under the weight of the superimposed pipe to produce an effective self-sealing between the interfitting members M and E of adjacent pipes.

From the foregoing description it is thought to be obvious that a pipe constructed in accordance with my invention is particularly well adapted for use by reason of the convenience and facility with which it may be assembled and operated.

I claim:

1. A pipe for oil wells or the like comprising a tubular body molded from an initially plastic material, preformed metallic end members for the extremities of the body, each of said members including a sleeve extending within the adjacent end of the body, an outstanding surrounding flange carried by each of the sleeves overlying the adjacent end of the body, one member constituting a male member and the other member constituting a female member, the inner end portion of the sleeve of the female member being provided with an inwardly disposed surrounding flange, the sleeve of the male member extending ontwardly beyond its flange a distance to allow the outer end of the sleeve of the male member to have close contact with the inner face of the flange of the female member, and a sealing flange carried by the inner face of the inwardly disposed flange and extending therearound and projecting outwardly beyond said inner face.

2. A pipe for oil wells or the like comprising a tubular body molded from an initially plastic material, preformed metallic end members for the extremities of the body, each of said members including a sleeve extending within the adjacent end of the body, and an outstanding surrounding flange carried by each of the sleeves overlying the adjacent end of the body, one member constituting a male member and the other member constituting a female member, the inner end portion of the sleeve of the female member being provided with an inwardly disposed surrounding flange, the sleeve of the male member extending outwardly beyond its flange a distance to allow the outer end of the sleeve of the male member to have close contact with the inner face of the flange of the female member, the outer edge face of the male member and the front face of the inwardly disposed flange of the female member being formed to allow interfitting of said portions of the members, a sealing flange carried by the inner face of the flange at the inner end of the female member, and a second sealing flange carried by the outer end face of the female member.

3. A pipe for oil wells or the like comprising a tubular body molded from an initially plastic material, preformed metallic end members for the extremities of the body, each of said members including a sleeve extending within the adjacent end of the body, an outstanding surrounding flange carried by each of the sleeves overlying the adjacent end of the body, one member constituting a male member and the other member constituting a female member, the inner end portion of the sleeve of the female member being provided with an inwardly disposed surrounding flange, the sleeve of the male member extending outwardly beyond its flange a distance to allow the outer end of the sleeve of the male member to have close contact with the inner face of the flange of the female member, the outer edge face of the male member and the front face of the inwardly disposed flange of the female member being formed to allow interfitting of said portions of the members, a sealing flange carried by the inner face of the flange at the inner end of the female member, and a second sealing flange carried by the outer end face of the female member, the inner face of the flange at the inner end of the female member and the outer edge face of said member being dished, the outer edge face of the sleeve of the male member and the outer face of the flange of the male member being on a curvature substantially the same as the curvature of the dished faces of the female member.

CHARLES E. KNOX, Jr.